UNITED STATES PATENT OFFICE.

GEORGE H. FELT, OF NEW YORK, N. Y., ASSIGNOR TO THE FELT ELECTRICAL COMPANY, OF SAME PLACE.

SOLUTION FOR GALVANIC BATTERIES.

SPECIFICATION forming part of Letters Patent No. 429,898, dated June 10, 1890.

Application filed January 13, 1890. Serial No. 336,795. (No specimens.)

*To all whom it may concern:*

Be it known that I, GEORGE H. FELT, a citizen of the United States, residing at New York, in the county of New York and State of New York, have invented certain new and useful Improvements in Solutions for Galvanic Batteries; and I do hereby declare the following to be a full, clear, and exact description of the invention, such as will enable others skilled in the art to which it appertains to make and use the same.

My invention relates to a new solution for galvanic batteries, the object being to provide an exciting-fluid for such batteries which shall be self-replenishing, and which can be furnished at little cost. To this end I have found well adapted a solution containing clay or sulphate of aluminium or some other aluminium compound from which the sulphate of aluminium in liquid form can be obtained. For example, to five pounds of clay add the solution of eight ounces of sulphuric acid in a hundred ounces of water. When clay is employed, the original liquid should be sulphuric acid more or less dilute. This decomposes the clay into its constituent parts, the silica remaining at the bottom and the aluminium being taken up to form the sulphate. When I use commercial sulphate of aluminium, I simply place it in water and allow it to dissolve until a saturated solution is obtained.

I have employed the solution obtained in both the described ways in galvanic batteries intended to deposit aluminium by electrolytic action. Such a battery forms the subject of a separate application, already filed in the Patent Office on November 13, 1889, Serial Number 330,118.

In carrying out the electrolytic process I add to the solution above described a weak solution of nitrate of mercury, and I find that the presence of the nitrate of mercury or other mercurial salt in the solution acts not only in such a manner as to assist in the electrolytic deposit of aluminium, but also to increase the electrical exciting capacity of the solution. Accordingly I desire to include the nitrate of mercury as an element in this invention.

In lieu of the weak solution of nitrate of mercury heretofore mentioned I may employ the following proportions, or thereabout of one ounce of mercury partly dissolved in a pound of nitric acid and three pints of water, which have been frequently shaken together to hold the mercury partly in mechanical suspension, and water added thereto in three times the volume of the resultant. By this means we have a weak solution of a salt or salts of mercury in the presence of metallic mercury.

The amount of sulphuric acid mentioned in the beginning of description is in excess of the amount of acid necessary to act on the clay, the remainder being to reduce the resistance and thus increase the electro-motive force. This same excess of sulphuric acid is kept up by the addition of sulphuric acid from time to time. In case the excess of acid is not entirely taken up by the clay, clay is added from time to time as the sulphuric acid is added to take up any excess of acid in the solution.

In practice I always provide an excess of the clay or the solid sulphate of aluminium, so that as the battery acts the clay or the sulphate may be drawn upon to form more of the solution.

Owing to the cheapness of clay and also of commercial sulphate of aluminium, I find that I can prepare this solution at very little cost and maintain it for an indefinite period with little additional expense.

By commercial sulphate of aluminium I do not mean ordinary rock-alum, which would give an alkaline solution, but the acid sulphate which is now purchasable under the name of sulphate of aluminium. The clay and the solid sulphate may both be put into the some solution, and in some instances I have found it advantageous to do this. A solution of any other mercurial salt besides the nitrate would be equivalent to the nitrate solution.

It will be understood that the present application does not confine itself to a solution for a depositing-battery, but that the solution herein described is claimed, broadly, for use in any galvanic battery.

I am aware that it is a common and well-known practice to add mercury in some form to battery solutions.

I am also aware that it is old to have in a battery an excess of the compound used, and to neither of such methods do I lay any broad claim.

Having thus described my invention, I claim—

1. A depolarizing solution for galvanic batteries, consisting of liquid sulphate of aluminium or other aluminium compound combined with a solution of a salt or salts of mercury in presence of metallic mercury, as set forth.

2. A depolarizing solution for galvanic batteries, consisting of liquid sulphate of aluminium combined with a solution of a salt or salts of mercury, as set forth.

3. A self-replenishing depolarizing solution for galvanic batteries, consisting of liquid sulphate of aluminium containing clay or other aluminium compound, as set forth.

4. A self-replenishing depolarizing solution for galvanic batteries, consisting of sulphuric acid containing an excess of clay, as set forth.

In testimony whereof I have affixed my signature in presence of two witnesses.

GEORGE H. FELT.

Witnesses:
D. G. STUART,
E. W. CADY.